United States Patent
Pan

(10) Patent No.: US 11,327,367 B2
(45) Date of Patent: May 10, 2022

(54) DISPLAY PANEL AND FABRICATING METHOD THEREOF

(71) Applicant: Himax Display, Inc., Tainan (TW)

(72) Inventor: Po-Hung Pan, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/999,050

(22) Filed: Aug. 20, 2020

(65) Prior Publication Data

US 2020/0379286 A1 Dec. 3, 2020

Related U.S. Application Data

(62) Division of application No. 16/373,655, filed on Apr. 3, 2019, now Pat. No. 10,795,213.

(51) Int. Cl.
*G02F 1/1339* (2006.01)
*G02F 1/1337* (2006.01)

(52) U.S. Cl.
CPC .......... *G02F 1/1339* (2013.01); *G02F 1/1337* (2013.01)

(58) Field of Classification Search
CPC ... G02F 1/1339; G02F 1/13398; G02F 1/1337
See application file for complete search history.

(56) References Cited

U.S. PATENT DOCUMENTS

| | | | | |
|---|---|---|---|---|
| 6,392,735 B1* | 5/2002 | Tani | ....................... | G02F 1/1339 349/156 |
| 2011/0194062 A1* | 8/2011 | Lee | ........................ | G02F 1/1339 349/149 |
| 2014/0355226 A1* | 12/2014 | Kim | ........................ | H05K 3/323 361/749 |
| 2019/0280013 A1* | 9/2019 | Fujikawa | .............. | H01L 27/124 |

* cited by examiner

*Primary Examiner* — James A Dudek
(74) *Attorney, Agent, or Firm* — JCIPRNET

(57) ABSTRACT

A display panel includes a first substrate, a second substrate, a display medium layer, a sealant and a conductor. The first and second substrates are assembled via the sealant that surrounds the display medium layer disposed between the first and second substrates. The second substrate includes a second conductive layer and a passivation layer disposed on the second conductive layer. The passivation layer reveals a portion of the second conductive layer. The conductor electrically connects a first conductive layer of the first substrate to the revealed portion of the second conductive layer and is disposed between the sealant and an edge of the display panel. A first conductive protrusion and a second conductive protrusion are sequentially disposed on one of the first and second substrates to form the conductor. A material of the second conductive protrusion may be formed from a conductive composite material, that may include a curable material.

7 Claims, 11 Drawing Sheets

DISPLAY PANEL AND FABRICATING METHOD THEREOF

CROSS-REFERENCE TO RELATED APPLICATION

This application is a divisional application of and claims the priority benefit of U.S. application Ser. No. 16/373,655, filed on Apr. 3, 2019, now allowed. The entirety of the above-mentioned patent application is hereby incorporated by reference herein and made a part of this specification.

BACKGROUND OF THE INVENTION

1. Field of the Invention

The present invention generally relates to an electronic device, in particular, to a display panel.

2. Description of Related Art

Liquid crystal display panels generally include a display medium layer sandwiched between two substrates that may serve as a liquid crystal cell. Each substrate generally includes a conductive layer. The display medium layer includes a display medium material, and the display medium material generally includes liquid crystal molecules that are driven by an electric field established between the substrates. The driving circuit for the liquid crystal display panel may be bonded to one of the substrates and thus a conductive material connected between the two substrates is required for the conductive layer on the other of the substrates to be electrically connected to the driving circuit. Adding conductive particles to an adhesive is one way of forming the conductive material placed between the substrates. However, the particles tend to aggregate causing non-uniformity in the cell gap between the substrates. The non-uniformity of the cell gap or deviation from parallel alignment of the two substrates affects the quality of the display panel. This adverse effect increases where greater amounts of conductive material, and therefore of conductive particles, are used to bridge the cell gap between the substrates.

SUMMARY OF THE INVENTION

A display panel according to the embodiments of the disclosure employs a conductive protrusion to reduce an amount of a conductive composite material including conductive particles that may on aggregation adversely affect the performance of the display panel.

A manufacturing method of a display panel according to the embodiments of the disclosure may produce a display panel having a desirable cell gap.

The disclosure provides a display panel including a first substrate, a second substrate, a display medium layer, a sealant and a conductor. The first substrate includes a first conductive layer. The second substrate is assembled with the first substrate and includes a second conductive layer and a passivation layer disposed on the second conductive layer. The passivation layer reveals a portion of the second conductive layer. The display medium layer is disposed between the first substrate and the second substrate. The sealant is disposed between the first substrate and the second substrate and surrounds the display medium layer. The conductor is disposed between the sealant and an edge of the display panel and is electrically connected between the first conductive layer and the second conductive layer, wherein the conductor is in contact with the revealed portion of the second conductive layer. The conductor includes a first conductive protrusion and a second conductive protrusion. The first conductive protrusion is in contact with one of the first conductive layer and the second conductive layer. The second conductive protrusion connects between the other of the first conductive layer and the second conductive layer and the first conductive protrusion. A material of the first conductive protrusion and a material of the second conductive protrusion are different.

In some embodiments, a height of the first conductive protrusion orthogonal to one of the first substrate and the second substrate is between 0.1 micrometer and 10 micrometers.

In some embodiments, the material of the first conductive protrusion is different from a material of the one of the first conductive layer and the second conductive layer.

In some embodiments, the material of the first conductive protrusion is the same as a material of the one of the first conductive layer and the second conductive layer.

In some embodiments, the first conductive protrusion is a stacked structure including more than one electrically conductive material.

In some embodiments, the first conductive protrusion has a tapered sidewall.

In some embodiments, the material of the second protrusion includes a matrix material and metal particles dispersed in the matrix material. In some of these embodiments, the matrix material includes a curable material.

In some embodiments, the first substrate further includes a first alignment layer disposed on the first conductive layer of the first substrate and facing the second substrate, and the second substrate further includes a second alignment layer disposed on the passivation layer of the second substrate and facing the first substrate.

In some embodiments, at least one of the first alignment layer and the second alignment layer extends to an edge of the conductor.

In some embodiments, at least one of the first alignment layer and the second alignment layer is enclosed by the sealant.

In some embodiments, the conductor is located within an area of at least one of the first alignment layer and the second alignment layer and the conductor penetrates through the at least one of the first alignment layer and the second alignment layer to be in contact with corresponding one of the first conductive layer and the second conductive layer.

In some embodiments, the conductor further includes a third conductive protrusion. The third conductive protrusion is in contact with the other of the first conductive layer and the second conductive layer and the second conductive protrusion is sandwiched between the first conductive protrusion and the third conductive protrusion.

The disclosure further provides a method of fabricating a display panel including the following steps. A first substrate and a second substrate are provided. The first substrate includes a first conductive layer and the second substrate includes a second conductive layer and a passivation layer disposed on the second conductive layer. A sealant material and a first conductive protrusion are formed on one of the first substrate and the second substrate, wherein the first conductive protrusion is located between an edge of the one of the first substrate and the second substrate and the sealant, and is in contact with a corresponding one of the first conductive layer and the second conductive layer. A conductive composite material is formed on the first conductive protrusion. The conductive composite material includes a matrix material and metal particles. The first substrate and the second substrate are assembled via the sealant material. A display medium layer is formed between the first substrate and the second substrate, wherein the display medium layer is surrounded by the sealant material. The sealant material and the conductive composite material are cured to form a sealant and a second conductive protrusion respectively.

In some embodiments, a material of the first conductive protrusion and a material of the second conductive protrusion are different.

In some embodiments, the matrix material includes a curable material.

In some embodiments, the metal particles include nickel particles.

In some embodiments, a material of the first conductive protrusion is the same as the corresponding one of the first conductive layer and the second conductive layer.

In some embodiments, assembling the first substrate and the second substrate causes the conductive composite material to be compressed.

In some embodiments, the other one of the first substrate and the second substrate further includes an alignment layer covering the other one of the first conductive layer and the second conductive layer and the conductive composite material penetrates the alignment layer to be in contact with the other one of the first conductive layer and the second conductive layer during the assembling of the first substrate and the second substrate.

In view of the above, the first conductive protrusion reduces the amount of material of the second protrusion required to electrically connect between the first conductive layer of the first substrate and the revealed portion of the second conductive layer of the second substrate. In embodiments where a precursor material of the second conductive protrusion is a conductive composite material including conductive particles, using less conductive composite material in the display panel prevents or reduces the non-uniformity of the gap between the first and second substrates caused by the aggregation of the conductive particles. Accordingly, the first conductive protrusion prevents or reduces the decreased performance of the display panel due to a non-uniform gap between the first and second substrates.

BRIEF DESCRIPTION OF THE DRAWINGS

The accompanying drawings are included to provide a further understanding of the invention, and are incorporated in and constitute a part of this specification. The drawings illustrate embodiments of the invention and, together with the descriptions, serve to explain the principles of the invention.

DESCRIPTION OF THE EMBODIMENTS

Figure 1:
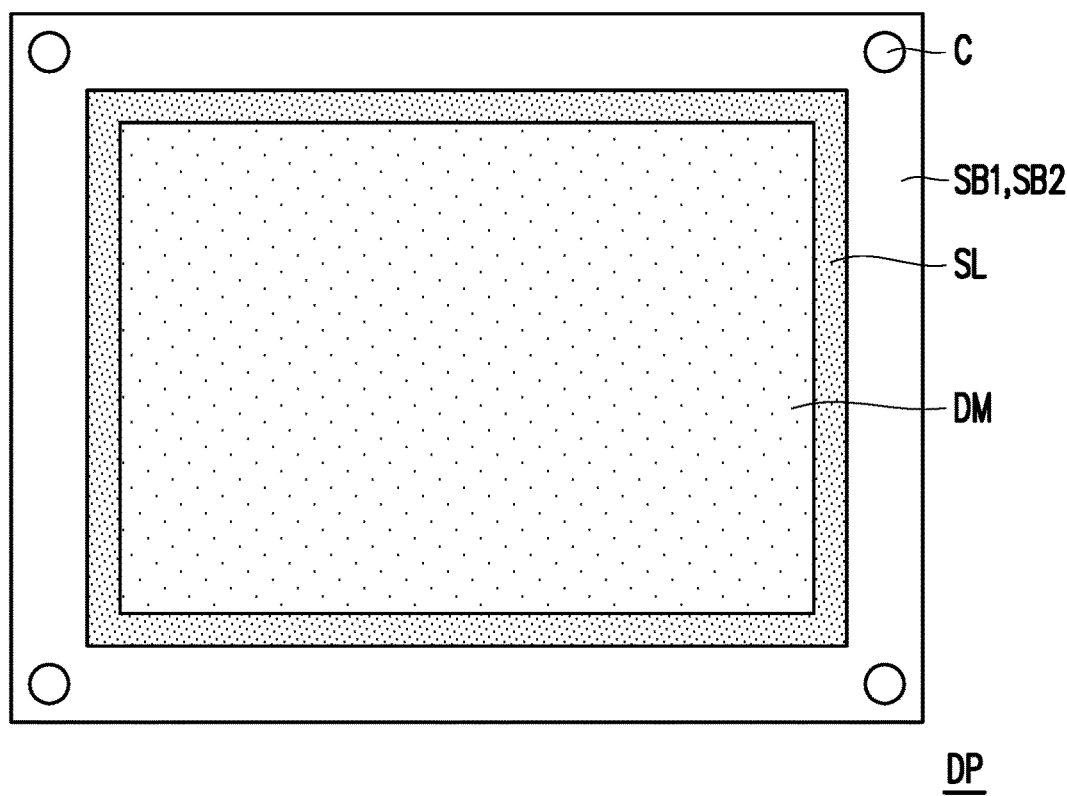
FIG. 1 schematically illustrates a top view of a display panel according to an embodiment of the present disclosure.

Reference will now be made in detail to the present preferred embodiments of the invention, examples of which are illustrated in the accompanying drawings. Wherever possible, the same reference numbers are used in the drawings and the descriptions to refer to the same or like parts.

FIG. 1 schematically illustrates a top view showing some components of a display panel DP. Referring to FIG. 1, the display panel DP includes a first substrate SB1, a second substrate SB2, a sealant SL, a display medium layer DM and a conductor C. Specifically, the first substrate SB1 and the second substrate SB2 are stacked in a top and bottom manner and the shape of the two substrates viewed from above may be substantially the same, such that the outline of the first substrate SB1 and the outline of the second substrate SB2 are aligned as shown in FIG. 1. The sealant SL is disposed between the first substrate SB1 and the second substrate SB2 to completely surround the display medium layer DM, such that the display medium layer DM and the sealant SL are sandwiched between the first substrate SB1 and the second substrate SB2. The sealant SL, as viewed from above, may have a frame-like pattern. The conductor C is disposed between the first substrate SB1 and the second substrate SB2 and located between the sealant SL and an edge of the display panel DP. In this particular embodiment, the conductor C numbers four, and the conductors C surround the sealant SL and are positioned at corners of the display panel DP. In alternative embodiments, the number of the conductor C may be less than four or more than four.

Figure 2:
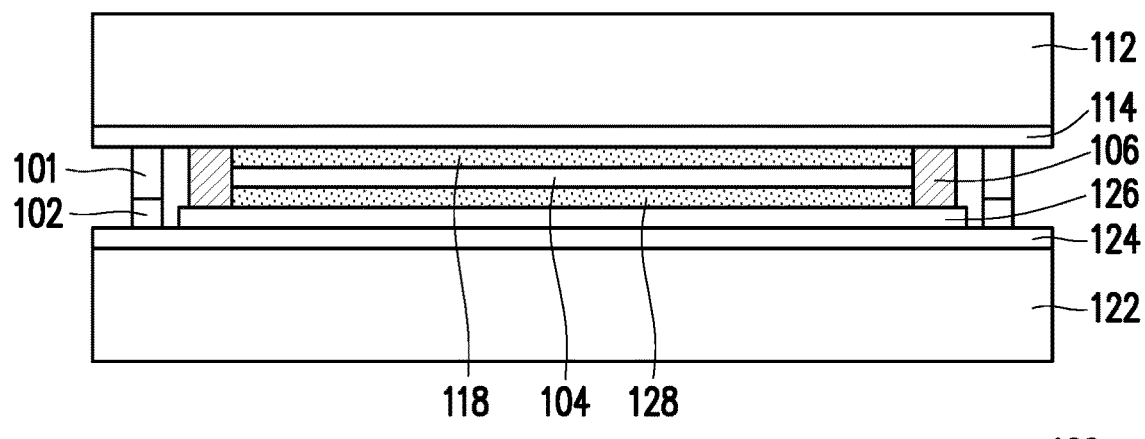
FIG. 2 schematically illustrates a cross section of a display panel according to an embodiment of the present disclosure.

FIG. 2 schematically illustrates a cross section of a display panel 100 according to an embodiment of the present disclosure. Referring to FIG. 2, the display panel 100 includes a first substrate 110, a second substrate 120, a display medium layer 104, a sealant 106, a first conductive protrusion 101 and a second conductive protrusion 102. The display panel 100 may have a top view similar to the display panel DP in FIG. 1, where the first conductive protrusion 101 and the second conductive protrusion 102 correspond to the conductor C in FIG. 1. In other words, the display panel 100 illustrated in FIG. 2 is similar to the display panel DP illustrated in FIG. 1, and component parts of the display panel 100 are similar to or the same as corresponding component parts of the display panel DP of FIG. 1. Further description of the display panel 100 depicted in FIG. 2 may omit detail that is the same as that of the already described display panel DP of FIG. 1.

In FIG. 2, the first substrate 110 and the second substrate 120 are arranged opposite and substantially parallel to each other and the sealant 106 is disposed between the first substrate 110 and the second substrate 120. Specifically, the first substrate 110 and the second substrate 120 are assembled with each other via the sealant 106. The display medium layer 104 is disposed between the first substrate 110 and the second substrate 120 and surrounded by the sealant 106. In some embodiments, the sealant 106 completely surrounds the display medium layer 104, such that the display medium layer 104 is encased by the first substrate 110, the second substrate 120 and the sealant 106. The material of the display medium layer 104 may be a liquid crystal material so that the first substrate 110, the second substrate 120, the display medium layer 104 and the sealant 106 may serve as a liquid crystal cell.

From outermost to innermost layer, the first substrate 110 may include a first support plate 112, a first conductive layer 114 and a first alignment layer 118. The first conductive layer 114 completely covers a side of the first support plate 112 facing the display medium layer 104; alternatively, the first conductive layer 114 may be patterned as required. A material of the first support plate 112 may be glass, quartz, polymer substrate, or the like. A material of the first conductive layer 114 may be a transparent conductive material, such as metal oxides including indium tin oxide (ITO), aluminum zinc oxide (AZO) or indium zinc oxide (IZO).

From outermost to innermost layer, the second substrate 120 may include a transistor array substrate including a second support plate 122, a second conductive layer 124, a passivation layer 126 and a second alignment layer 128. The second conductive layer 124 is disposed at a side of the second support plate 122 facing the display medium layer 104. The second support plate 122 may be a glass plate, a silicon backplane or the like. The second conductive layer 124 may be a layer of a transistor array such as a thin film transistor (TFT) array or a CMOS (Complementary Metal-Oxide Semiconductor) device array. The passivation layer 126 may include an oxide or nitride of the material used for the second conductive layer 124 below or other material that is corrosion resistant to protect the second conductive layer 124 from corrosion. The first conductive layer 114 of the first substrate 110 and the transistor array of the second substrate 120 may provide an electric field across the display medium layer 104 to, for example, drive liquid crystal molecules in the display medium layer 104. The display panel 100 may be a thin-film transistor liquid-crystal display (TFT-LCD) panel or an LCoS (liquid crystal on silicon) display panel. The passivation layer 126 is formed or patterned to reveal a surface of the second conductive layer 124 below, wherein the revealed surface of the second conductive layer 124 is at least large enough to allow the second conductive protrusion 102 to be in contact with the second conductive layer 124. In this particular embodiment, the passivation layer 126 reveals an outer portion of the second conductive layer 124 that extends to an edge of the display panel 100.

The first alignment layer 118 and the second alignment layer 128 interface with the display medium layer 104. In some embodiments, the display medium layer 104 is a liquid crystal layer, and the first alignment layer 118 and the second alignment layer 128 may orient the liquid crystal molecules and induce a pre-tilt angle of the liquid crystal molecules. Properties of the first alignment layer 118, including a material thereof, may be the same as that of the second alignment layer 128, but the present disclosure is not limited thereto. In this particular embodiment, the first alignment layer 118 and the second alignment layer 128 extend to an inner edge of the sealant 106.

The first conductive protrusion 101 and the second conductive protrusion 102 are stacked in a top and bottom manner and the shape of the two protrusions viewed from above may be substantially the same, such that the outline of the first conductive protrusion 101 and the outline of the second conductive protrusion 102 are aligned. The first conductive protrusion 101 and the second conductive protrusion 102 may construct the conductor C shown in FIG. 1. The first conductive protrusion 101 is in contact with the first conductive layer 114 and the second conductive protrusion 102 is in contact with the first conductive protrusion 101 and the revealed portion of the second conductive layer 124. That is, the first conductive protrusion 101 and the second conductive protrusion 102 bridge the gap between the first substrate 110 and the second substrate 120 to electrically connect the first conductive layer 114 to the second conductive layer 124.

Figure 3A:
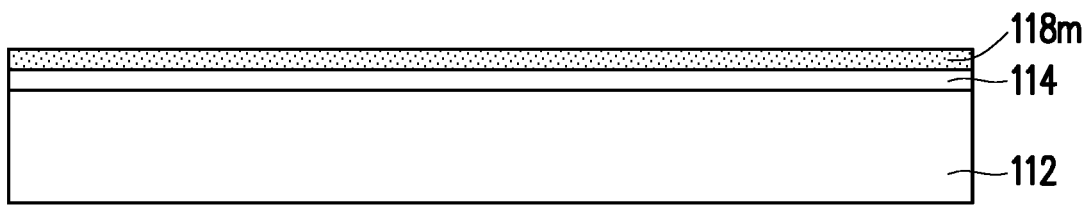
FIGS. 3A to 3E are schematic cross-sectional views illustrating a manufacturing method of a display panel according to an embodiment of the present disclosure.
Figure 3B:
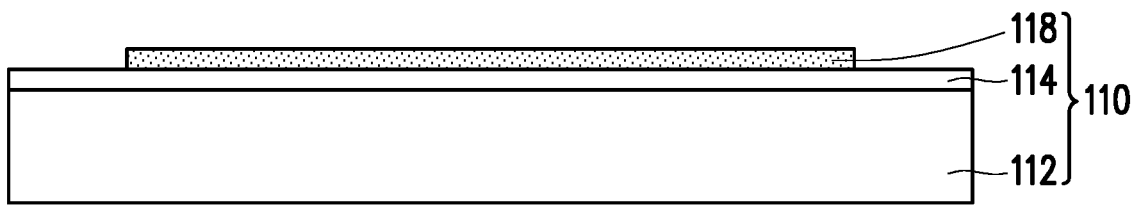
Figure 3C:
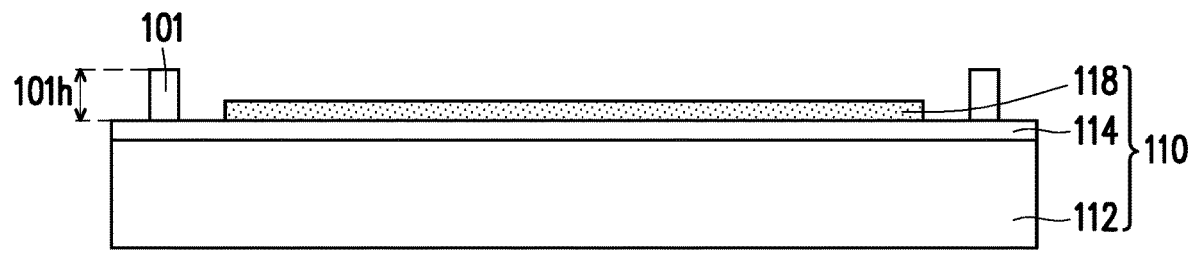
Figure 3D:
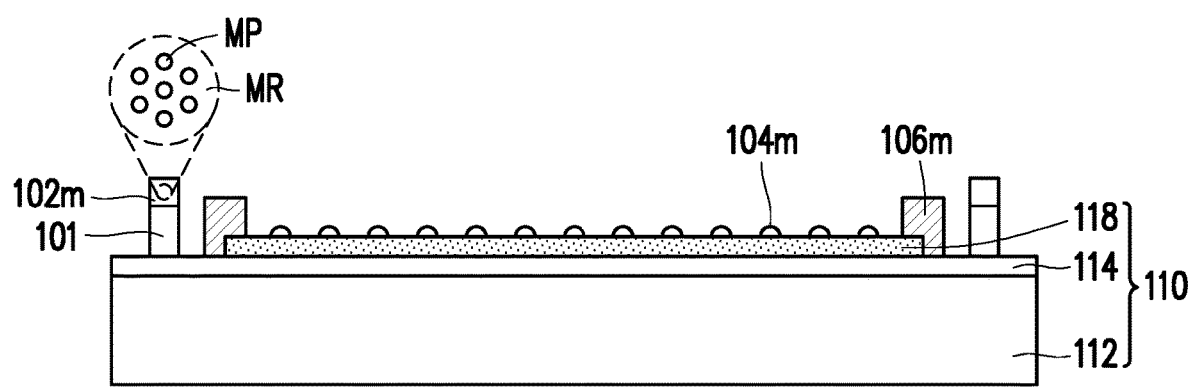
Figure 3E:
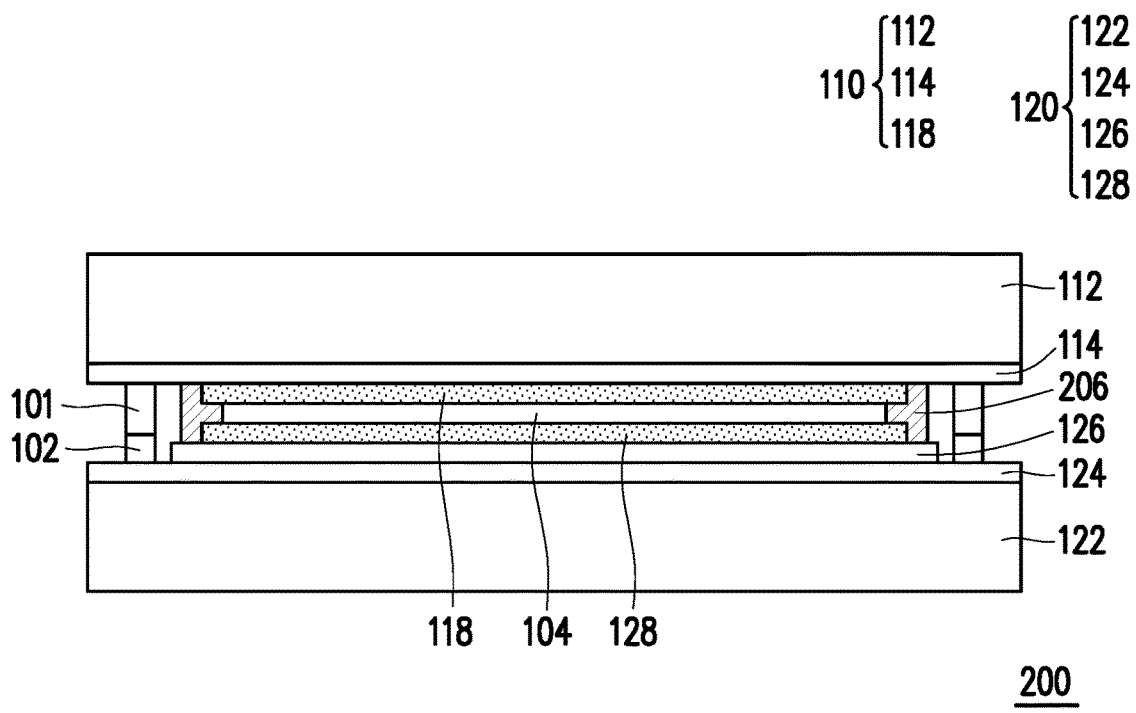

FIGS. 3A to 3E are schematic cross-sectional views illustrating a manufacturing method of a display panel 200 according to an embodiment of the present disclosure. The manufacturing method of the display panel 200 of FIG. 3E may include the following steps, but the present disclosure is not limited thereto, and the order of the steps is also not limited to the here presented order of steps. The display panel 200 of FIG. 3E is similar to the display panel 100 of FIG. 2, and component parts of the display panel 200 are similar to or the same as corresponding component parts of the display panel 100 of FIG. 2. Further description of the display panel 200 depicted in FIG. 3E may omit detail that is the same as that of the already described display panel 100 of FIG. 2.

Regarding FIG. 3A, a first support plate 112 and a first conductive layer 114 disposed on the first support plate 112 are provided. A first alignment material layer 118*m* is disposed on the first conductive layer 114. A material of the first alignment material layer 118*m* may be organic, such as thermally curable or UV-curable polyimide, or inorganic, such as silicon oxide, zinc oxide or a combination thereof.

Regarding FIG. 3B, the first alignment material layer 118*m* is patterned to form a first alignment layer 118. However, the present disclosure is not limited thereto. In other embodiments, the first alignment layer 118 may be formed directly as the desired pattern, thereby omitting the patterning step after the forming step. The first support plate 112, the first conductive layer 114 and the first alignment layer 118 are stacked sequentially to form a first substrate 110. The first substrate 110 of FIG. 3B may be similar to that depicted in FIG. 2. The first alignment layer 118 covers a central portion of the first conductive layer 114 revealing an outer or peripheral portion of the first conductive layer 114. However, the present disclosure is not limited thereto. In other embodiments, the first alignment layer may have a different pattern. In some embodiments, a material of the first alignment material layer 118*m* is organic, and the first alignment layer 118 may be formed by a wet process such as spin coating, slit coating, flexographic coating (APR coating) or ink-jet printing. Raw materials used may include polyamic acid or polyimide, which may then be cured to form the first alignment layer 118. A resulting organic material of the first alignment layer 118 may include thermally cured polyimide or UV-cured polyimide. In some embodiments, the material of the first alignment material layer 118*m* is inorganic, and the first alignment layer 118 may, for example, be formed by a sol-gel process or thermal evaporation of the desired material, such as obliquely deposited silicon oxide ($SiO_x$), nanostructured zinc oxide (ZnO) or nanoporous anodic aluminium oxide. The first alignment material layer 118*m* of inorganic material may be patterned by etching, including wet etching or dry etching such as laser etching or plasma etching to produce the first alignment layer 118. Alternatively, the first alignment layer 118 of inorganic material may be formed and patterned directly in the required pattern by, for example, using a shadow mask during the thermal evaporation process to shield areas where the material of the first alignment layer 118 is not desired. In some embodiments, the first alignment layer 118 of inorganic material may be further modified with a hydrophobic material. The first alignment layer 118 may have a thickness between around 200 and 2000 angstroms.

Regarding FIG. 3C, a first conductive protrusion 101 is formed on the revealed portion of the first conductive layer 114. The first conductive protrusion 101 may be similar to that depicted in FIG. 2. The first conductive protrusion 101 may be a monolithic structure of a single material as shown in FIG. 3C, or alternatively may be a stacked structure with more than one conductive material. A material of the first conductive protrusion 101 may include indium tin oxide (ITO), indium gallium zinc oxide (IGZO), zinc oxide (ZnO), other electrically conducting metal oxides, aluminium, gold or other metals. The material of the first conductive protrusion 101 may be the same as a material of the first conductive layer 114, the second conductive layer 124 or may be different from these. In this particular embodiment illustrated in FIGS. 3C-3E, the material of the first conductive protrusion 101 is different from that of the first conductive layer 114 and the second conductive layer 124. The first conductive protrusion 101 may be formed by film deposition such as thermal evaporation or sputtering. A height 101h of the first conductive protrusion 101 may be from about 0.1 micrometer to 10 micrometers.

Regarding FIG. 3D, a sealant material 106m is formed on the first substrate 110. In this particular embodiment, the sealant material 106m is formed on an outer portion of the first alignment layer 118 and a portion of the revealed portion of the first conductive layer 114 adjacent to the edge of the first alignment layer 118. However, the present disclosure is not limited thereto. In other embodiments, the sealant material 106m may be disposed entirely on the first alignment layer 118 or the revealed portion of the first conductive layer 114. A display medium material 104m, such as a liquid crystal material, is disposed on the first alignment layer 118. The display medium material 104m may be disposed on the first alignment layer 118 via a one drop filling (ODF) process, but the present disclosure is not limited thereto. A second conductive protrusion material 102m is formed on the first conductive protrusion 101. A material of the second conductive protrusion material 102m may be a conductive composite material. The conductive composite material may be compressible and include a matrix material MR and metal particles MP dispersed in the matrix material MR. The matrix material MR may include a curable material, and the metal particles MP may include nickel particles, or other metal particles.

Regarding FIG. 3E, a second substrate 120 including a second support plate 122, a second conductive layer 124, a passivation layer 126 and a second alignment layer 128 stacked sequentially is provided. The second substrate 120 may be similar to that depicted in FIG. 2. The second alignment layer 102 may be similar to the first alignment layer 101 and may be formed in a similar manner to that for the first alignment layer 101. Thereafter, the first substrate 110 and the second substrate 120 are assembled via the sealant material 106m, such that the sealant material 106m and the second conductive protrusion material 102m are compressed. The display medium material 104m may fill a display medium space surrounded by the sealant material 106m, the first substrate 110 and the second substrate 120 to form a display medium layer 104. In alternative embodiments, the second conductive protrusion material 102m shown in FIG. 3D may be formed on the revealed portion of the second conductive layer 124 of the second substrate 120 before assembling the first substrate 110 and the second substrate 120 such that the second conductive protrusion material 102m and the first conductive protrusion 101 are not in contact with each other until the first substrate 110 and the second substrate 120 are assembled.

The sealant material 106m may include a curable material, such as a light curable material. Similarly, the second conductive protrusion material 102m includes the curable matrix material MR with metal particles MP dispersed therein. In some embodiments, the matrix material MR of the second conductive protrusion material 102m may be the same as the sealant material 106m, but the disclosure is not limited thereto. A light or thermal curing step may be performed to the sealant material 106m and the second conductive protrusion material 102m after joining the first substrate 110 and the second substrate 120 to form a sealant 206 and the second conductive protrusion 102 respectively, such that the display panel 200 may be formed. In alternative embodiments, the display medium material 104m may be introduced into the display medium space via a vacuum injection process after the assembly of the first substrate 110 and the second substrate 120 via the cured sealant 206. Namely, the injection of the display medium material 104m may be performed after the formation of the sealant 206 and the conductor consisting of the first conductive protrusion 101 and the second conductive protrusion 102.

The display panel 200 is similar to the display panel 100 shown in FIG. 2. A difference between the display panels 100 and 200 lies in that the sealant 206 of the display panel 200 is positioned partially on the first and second alignment layers 118 and 128 and partially on the first conductive layer 114 and the passivation layer 126, while the sealant 106 of the display panel 100 is completely positioned on the first conductive layer 114 and the passivation layer 126. In other words, prior to assembly of the first substrate 110 and the second substrate 120, a quantity and a position of the display medium material 104m and the sealant material 106m deposited on the first alignment layer 118 and the first conductive layer 114, as shown in FIG. 3D, may be adjusted in order to achieve a desired size and position of the sealant 206 and the display medium layer 104 in the assembled display panel 200. In the step of assembling the first substrate 110 and the second substrate 120, the second conductive protrusion material 102m is compressed. Compression of the second conductive protrusion material 102m may cause some aggregation of the metal particles MP. However, the amount of conductive protrusion material 102m used is not sufficient enough for there to be substantial aggregation leading to non-uniformity in the cell gap between the first substrate 110 and the second substrate 120 that adversely affects the quality of the display panel. Therefore, by combining the second conductive protrusion material 102m with the first conductive protrusion 101, the adverse effect of non-uniformity in the cell gap is prevented or sufficiently reduced.

FIGS. 4 to 9 each schematically illustrates a cross section of a display panel according to an embodiment of the present disclosure. Regarding FIGS. 4 to 9, each of the display panels 300 to 800 is similar to the display panel 200 of FIG. 3E.

Figure 4:
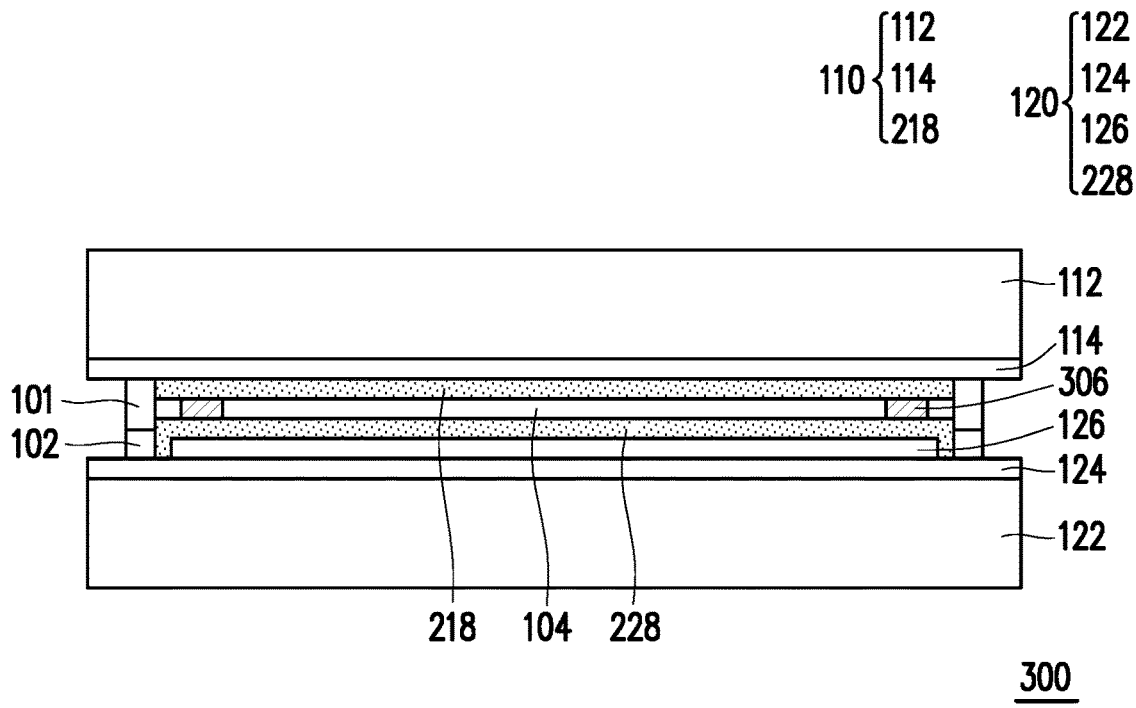
FIGS. 4 to 9 each schematically illustrates a cross section of a display panel according to an embodiment of the present disclosure.

Regarding FIG. 4, the display panel 300 includes a first substrate 110, a second substrate 120, a display medium layer 104, a sealant 306, a first conductive protrusion 101 and a second conductive protrusion 102. From outermost to innermost layer, the first substrate 110 includes a first support plate 112, a first conductive layer 114 and a first alignment layer 218 and the second substrate 120 includes a second support plate 122, a second conductive layer 124, a passivation layer 126 and a second alignment layer 228. The display panel 300 of FIG. 4 differs from the display panel 200 of FIG. 3E in that the first alignment layer 218 and the second alignment layer 228 extend to an inner edge of the conductor consisting of the first conductive protrusion 101 and the second conductive protrusion 102. The second alignment layer 228 may also extend in a gap between the passivation layer 126 and the second conductive protrusion 102 of the conductor. The first alignment layer 218 and the second alignment layer 228 may otherwise be similar to and be formed in a similar manner to the first alignment layer 118 and the second alignment layer 128 of the display panel 200 of FIG. 3E.

Figure 5:
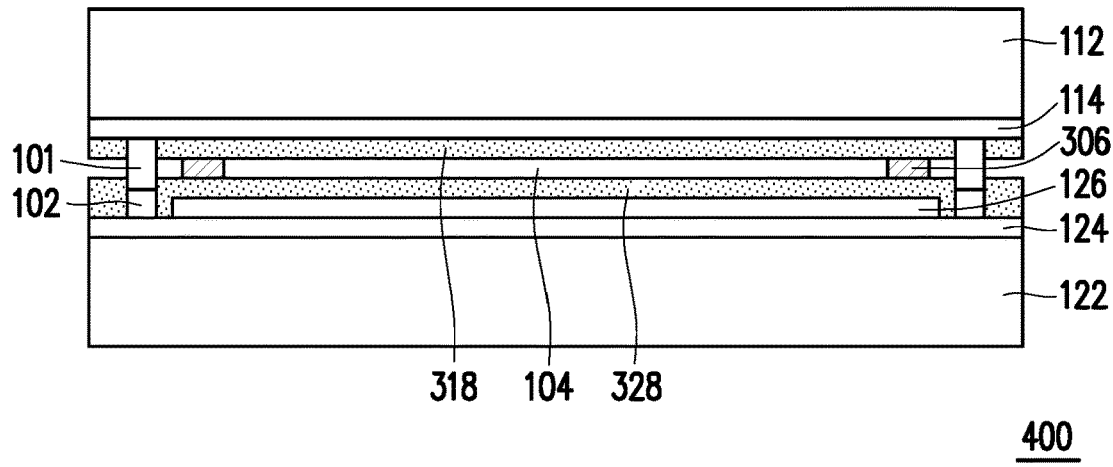

Regarding FIG. 5, the display panel 400 includes a first substrate 110, a second substrate 120, a display medium layer 104, a sealant 306, a first conductive protrusion 101 and a second conductive protrusion 102. From outermost to innermost layer, the first substrate 110 includes a first support plate 112, a first conductive layer 114 and a first alignment layer 318 and the second substrate 120 includes a second support plate 122, a second conductive layer 124, a passivation layer 126 and a second alignment layer 328. The display panel 400 of FIG. 5 differs from the display panel 200 of FIG. 3E in that the first conductive protrusion 101 is located within an area of and penetrates through the first alignment layer 318 to be in contact with the first conductive layer 114, and similarly for the second conductive protrusion 102, the second alignment layer 328 and the second conductive layer 124. The first alignment layer 318 and the second alignment layer 328 may extend to an edge of the display panel 400. The first alignment layer 318 and the second alignment layer 328 may otherwise be similar to and be formed in a similar manner to the first alignment layer 118 and the second alignment layer 128 of the display panel 200 of FIG. 3E.

Figure 6:
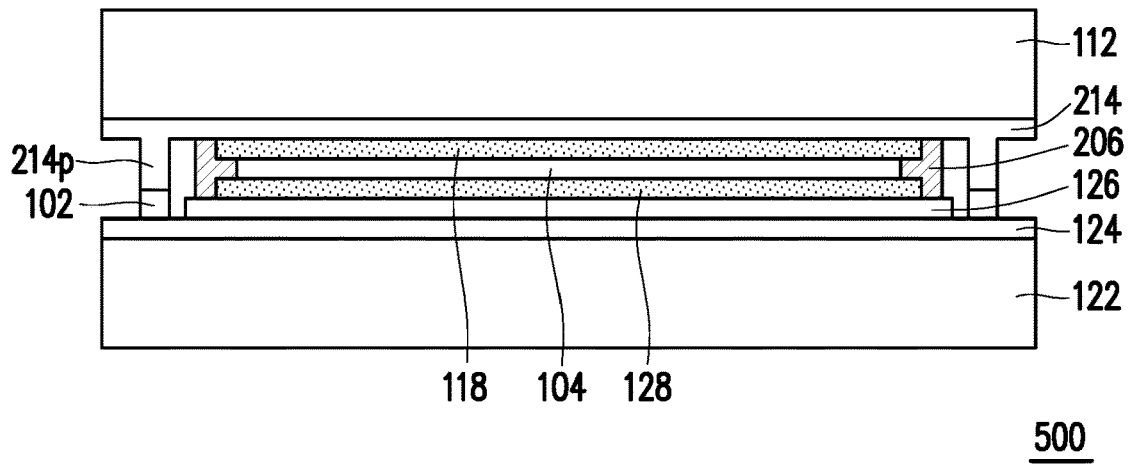

Regarding FIG. 6, the display panel 500 includes a first substrate 110, a second substrate 120, a display medium layer 104, a sealant 206, a first conductive protrusion 214p and a second conductive protrusion 102. From outermost to innermost layer, the first substrate 110 includes a first support plate 112, a first conductive layer 214 and a first alignment layer 118. The first conductive protrusion 214p is formed integrally with the first conductive layer 214. The display panel 500 of FIG. 6 differs from the display panel 200 of FIG. 3E in that the first conductive protrusion 214p is of a same material as the rest of the first conductive layer 214. The first conductive protrusion 214p may be formed from a thick portion of material of the first conductive layer 214 in a subtractive process by, for example, etching, such that the remaining portion of the first conductive layer 214 is thinner than the first conductive protrusion 214p. In an alternative embodiment, the first conductive protrusion 214p may be formed in an additive process, for example, in a similar manner to that of the first conductive protrusion 101 of the display panel 200 of FIG. 3E. However, the present disclosure is not limited thereto. The first conductive protrusion 214p may otherwise be similar to the first conductive protrusion 101 of the display panel 200 of FIG. 3E.

Figure 7:
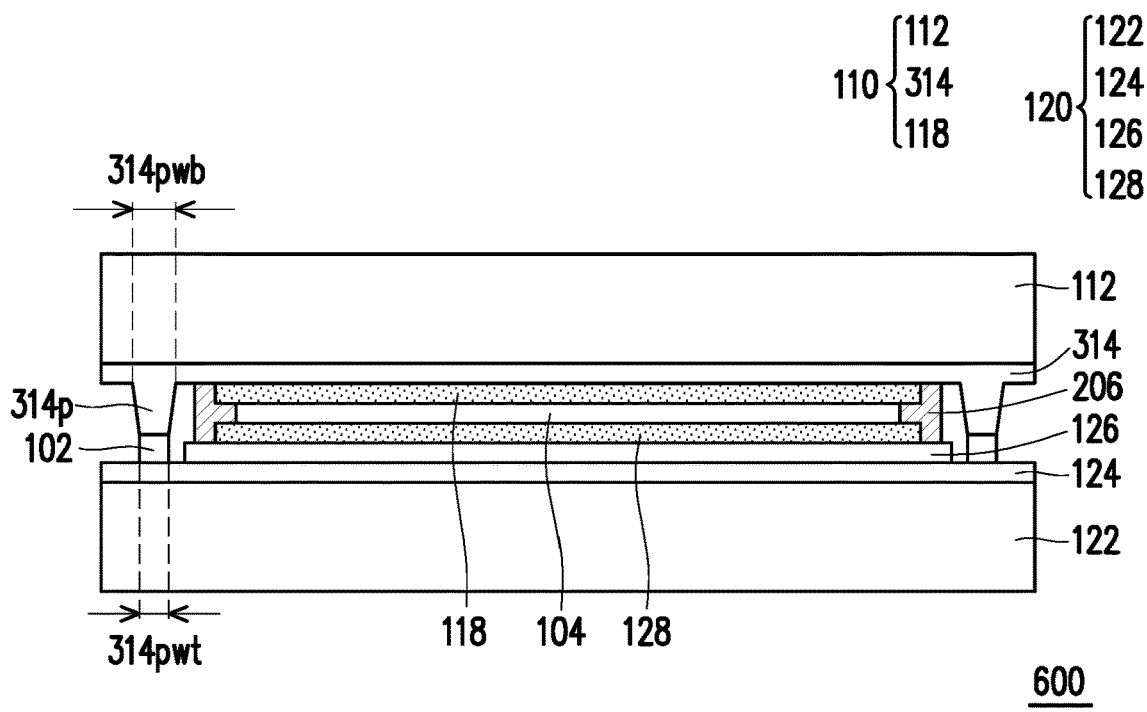

Regarding FIG. 7, the display panel 600 includes a first substrate 110, a second substrate 120, a display medium layer 104, a sealant 206, a first conductive protrusion 314p and a second conductive protrusion 102. From outermost to innermost layer, the first substrate 110 includes a first support plate 112, a first conductive layer 314 and a first alignment layer 118. The first conductive protrusion 314p is formed integrally with the first conductive layer 314. The display panel 600 of FIG. 7 differs from the display panel 500 of FIG. 6 in that a sidewall of the first conductive protrusion 314p is tapered, such that a width 314pwt of a top surface of the first conductive protrusion 314p is smaller than a width 314pwb of a base of the first conductive protrusion 314p. The first conductive protrusion 314p may otherwise be similar to and be formed in a similar manner to the first conductive protrusion 214p of the display panel 500 of FIG. 6.

Figure 8:
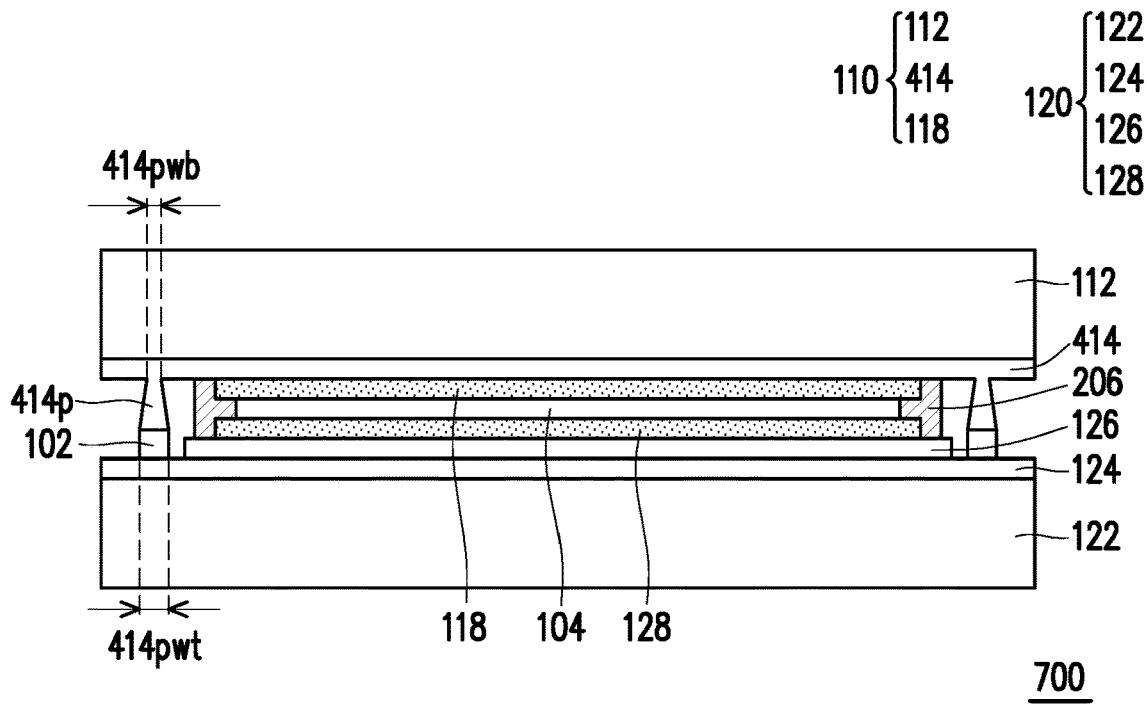

Regarding FIG. 8, the display panel 700 includes a first substrate 110, a second substrate 120, a display medium layer 104, a sealant 206, a first conductive protrusion 414p and a second conductive protrusion 102. From outermost to innermost layer, the first substrate 110 includes a first support plate 112, a first conductive layer 414 and a first alignment layer 118. The first conductive protrusion 414p is formed integrally with the first conductive layer 414. The display panel 700 of FIG. 8 differs from the display panel 500 of FIG. 6 in that a sidewall of the first conductive protrusion 414p is tapered, such that a width 414pwt of a top surface of the first conductive protrusion 414p is larger than a width 414pwb of a base of the first conductive protrusion 414p. The first conductive protrusion 414p may otherwise be similar to and be formed in a similar manner to the first conductive protrusion 214p of the display panel 500 of FIG. 6.

Figure 9:
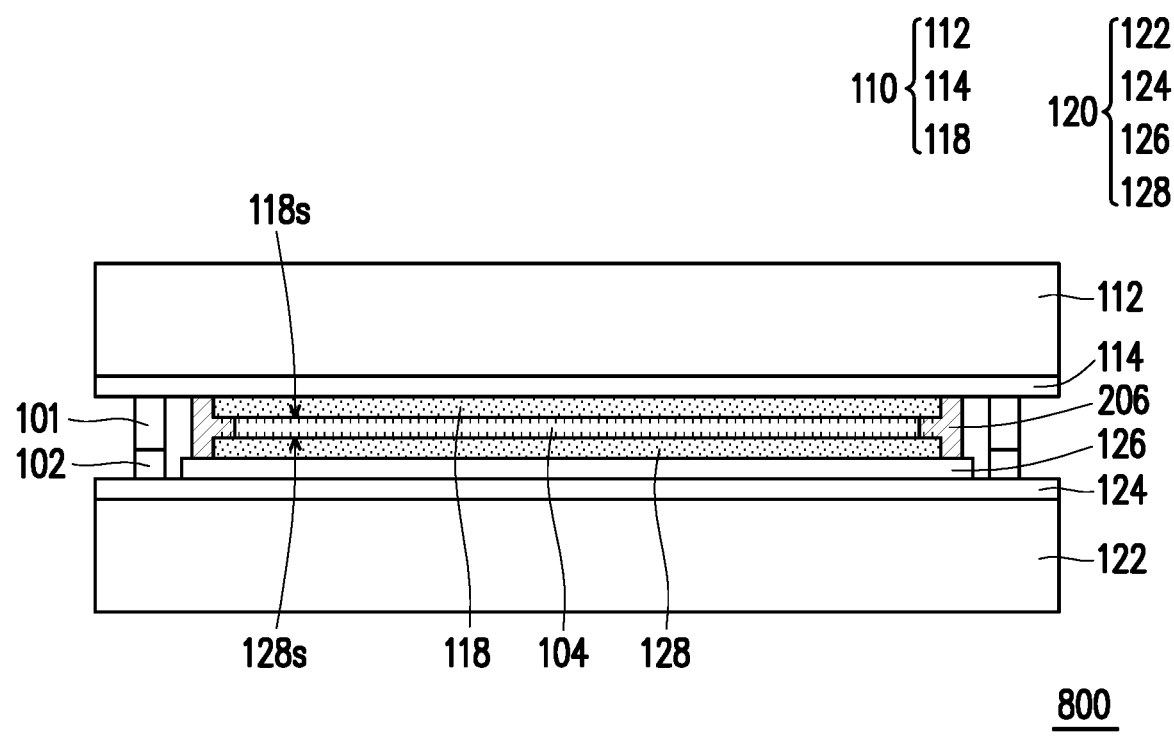

Regarding FIG. 9, the display panel 800 includes a first substrate 110, a second substrate 120, a display medium layer 104, a sealant 206, a first conductive protrusion 101 and a second conductive protrusion 102. From outermost to innermost layer the first substrate 110 includes a first support plate 112, a first conductive layer 114 and a first alignment layer 118. The first substrate 110 may be similar to that depicted in FIG. 3B, but the surface of the first alignment layer 118 facing the display medium layer 104 may be modified to form a hydrophobic surface 118s. From outermost to innermost layer, the second substrate 120 includes a second support plate 122, a second conductive layer 124, a passivation layer 126 and a second alignment layer 128 sequentially stacked. A similar hydrophobic modification may be applied to a surface of the second alignment layer 128 facing the display medium layer 104 to form a hydrophobic surface 128s. The hydrophobic surfaces 118s and 128s may be formed by performing a hydrophobic modification on the surfaces of the first alignment layer 118 and the second alignment layer 128. The hydrophobic modification may be performed by disposing a hydrophobic material on the surface by, for example, chemical vapor deposition or ink-jet printing. The hydrophobic material may include silanes, fluorinated silanes, long-chain alcohols or acids.

The hydrophobic surfaces 118s and 128s may have a water contact angle greater than 60 degrees. In the present embodiment, the entire surfaces of the first alignment layer 118 and the second alignment layer 128 facing the display medium layer 104 may be modified. However, the present disclosure is not limited thereto. The hydrophobic surface may be formed directly as or patterned to a desired pattern. For instance, the hydrophobic molecules on a portion of the hydrophobic surface 118s and/or a portion of the hydrophobic surface 128s may be removed by UV exposure or plasma etching.

FIGS. 10A to 10D are schematic cross-sectional views illustrating a manufacturing method of a display panel 900 according to an embodiment of the present disclosure. The manufacturing method of the display panel 900 of FIG. 10D may include the following steps, but the present disclosure is not limited thereto, and the order of the steps is also not limited to the here presented order of steps. The manufacturing method depicted in FIGS. 10A to 10D will be described omitting detail that is the same as that of the already described manufacturing method of the display panel 200 of FIGS. 3A to 3E.

Figure 10A:
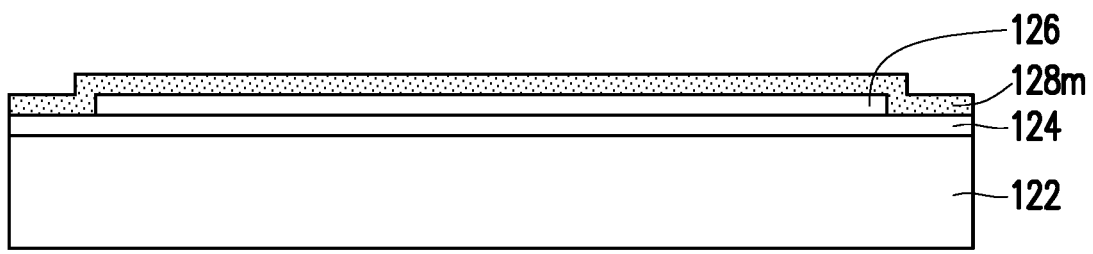
FIGS. 10A to 10D are schematic cross-sectional views illustrating a manufacturing method of a display panel according to an embodiment of the present disclosure.

Regarding FIG. 10A, a second support plate 122, a second conductive layer 124 and a passivation layer 126 sequentially stacked are provided. A second alignment material layer 128m is disposed on the passivation layer 126 and on a revealed portion of the second conductive layer 124. A material of the second alignment material layer 128m may be similar to that of the first alignment material layer 118m of FIG. 3A. In the present embodiment, the second conductive layer 124 may be one conductive layer in an active layer formed on the second support plate 122 though further detail of the active layer is not shown. In some instances, the active layer may include a transistor array such as a thin film transistor (TFT) array or a CMOS (Complementary Metal-Oxide Semiconductor) device array and the passivation layer 126 is a dielectric layer covering the active layer.

Figure 10B:
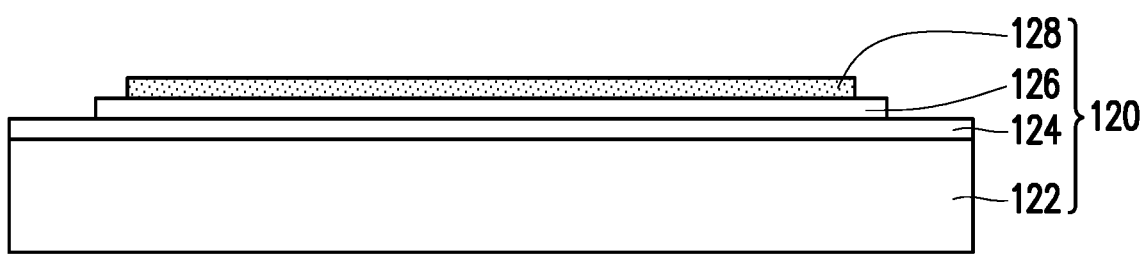

Regarding FIG. 10B, the second alignment material layer 128m is patterned to form a second alignment layer 128. However, the present disclosure is not limited thereto. In other embodiments, the second alignment layer 128 may be formed directly as the desired pattern, thereby omitting the patterning step after the forming step. In the present embodiment, the second alignment material layer 128m is patterned such that an outer portion of the passivation layer 126 is revealed by the second alignment layer 128. However, the present disclosure is not limited thereto. In other embodiments, the second alignment layer 128 may extend further toward or to an edge of the second support plate 122. The second alignment layer 128 may be patterned in similar manner to that of the first alignment layer 118 of FIGS. 3A and 3B.

Figure 10C:
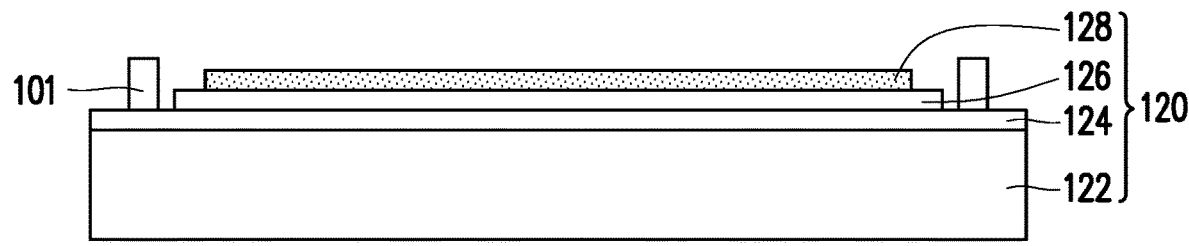

Regarding FIG. 10C, a first conductive protrusion 101 is formed on the revealed portion of the second conductive layer 124. The first conductive protrusion 101 may be similar and formed in a similar manner to the first conductive protrusion 101 of FIG. 3C. Namely, the first conductive protrusion 101 is made of indium tin oxide (ITO), indium gallium zinc oxide (IGZO), zinc oxide (ZnO), other electrically conducting metal oxides, aluminium, gold or other metals.

Figure 10D:
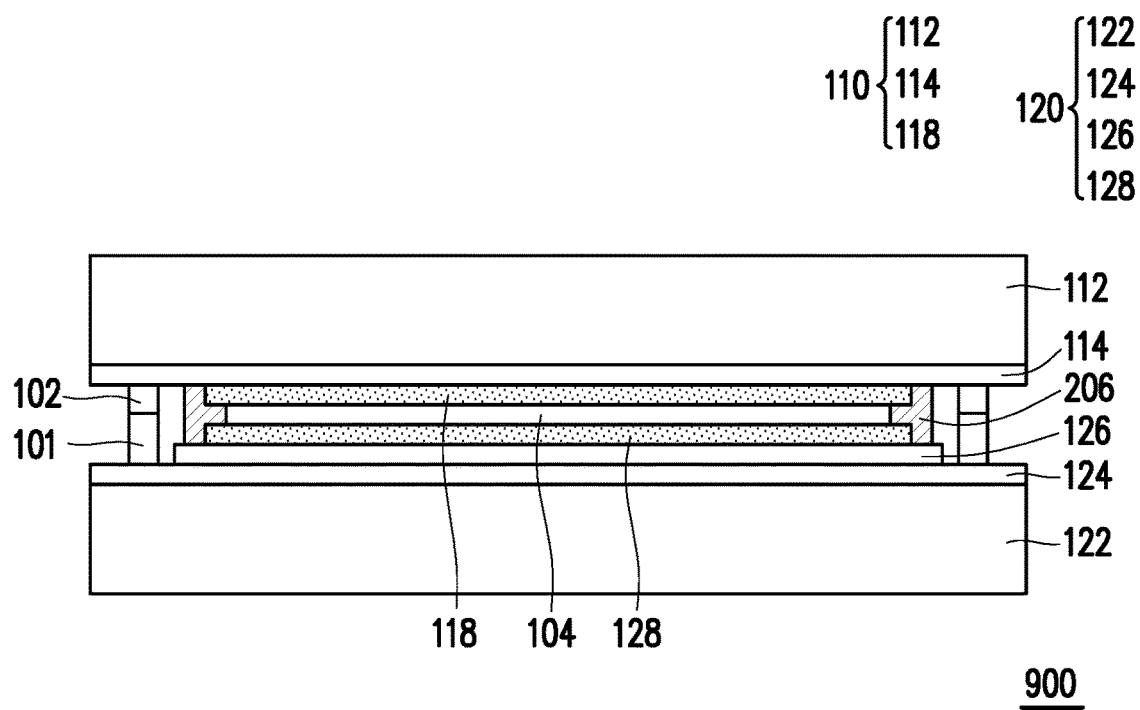

Regarding FIG. 10D, subsequent steps are the same as described for the display panel 200 in relation to FIGS. 3D to 3E, with further parts depicted in FIG. 10D and any intermediary versions thereof being the same as or similar to corresponding ones depicted in FIGS. 3D to 3E. This results in the display panel 900 having a first substrate 110, a second substrate 120, a display medium layer 104, a sealant 206, a first conductive protrusion 101 and a second conductive protrusion 102, wherein the first conductive protrusion 101 is in contact with the second conductive layer 124 of the second substrate 120. The second conductive protrusion 102 includes a matrix material MR and metal particles MP dispersed in the matrix material MR and the matrix material MR may be a curable material. The matrix material MR and metal particles MP in this embodiment may be similar to those in the display panel 200 of FIG. 3E and are shown in FIG. 3D. The second conductive protrusion 102 is cured after the first substrate 110 and the second substrate 120 are joined by the sealant material, the sealant material forming the sealant 206 when cured. Given that the second conductive protrusion 102 need not be large enough to span the gap between the first conductive layer 114 and the second conductive layer 124 to provide a continuous electrical connection therebetween, the aggregation effect of the metal particles MP in the second conductive protrusion 102 may not be sufficient to adversely affect the uniformity of the gap between the first substrate 110 and the second substrate 120. Accordingly, the display panel 900 may be of sufficient quality and the manufacture thereof may have an improved yield rate.

Figure 11:
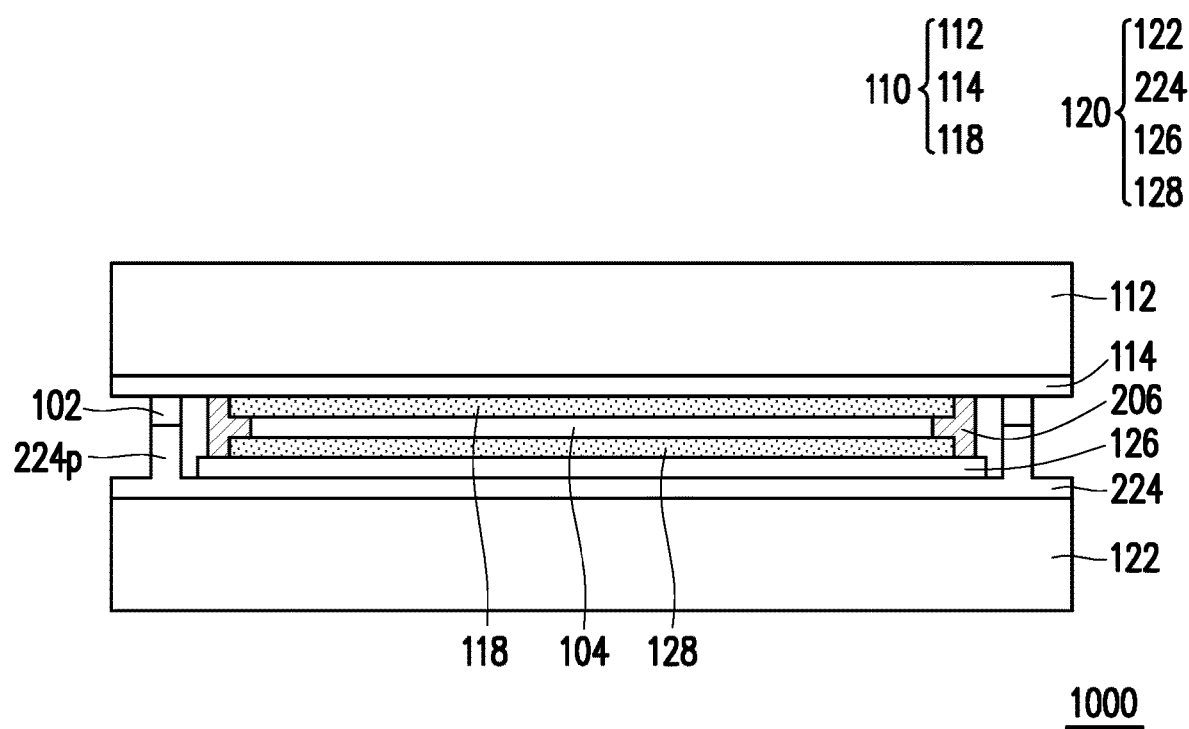
FIG. 11 schematically illustrates a cross section of a display panel according to an embodiment of the present disclosure.

FIG. 11 schematically illustrates a cross section of a display panel according to an embodiment of the present disclosure. Regarding FIG. 11, the display panel 1000 is similar to the display panel 900 of FIG. 10D and to the display panel 500 of FIG. 6. The display panel 1000 includes a first substrate 110, a second substrate 120, a display medium layer 104, a sealant 206, a first conductive protrusion 224p and a second conductive protrusion 102. The second substrate 120 includes a second support plate 122, a second conductive layer 224, a passivation layer 126, a first conductive protrusion 224p and a second alignment layer 128. The first conductive protrusion 224p is formed integrally with the first conductive layer 224. The display panel 1000 of FIG. 11 differs from the display panel 900 of FIG. 10D in that the first conductive protrusion 224p is of a same material as the rest of the second conductive layer 224. The first conductive protrusion 224p may otherwise be similar to and formed in a similar manner to the first conductive protrusion 214p of the display panel 500 of FIG. 6.

In another similar embodiment to that of the display panel 1000 of FIG. 11, a display panel with a first conductive protrusion disposed on and of the same material as a second conductive layer may also have first and/or second alignment layers each having a hydrophobic surface similar and formed in a similar manner to that of the first alignment layer 118 and second alignment layer 128 of FIG. 9. In preferred embodiments, the alignment layers with a hydrophobic surface may be inorganic, and the alignment layers without a hydrophobic surface may be organic.

Figure 12:
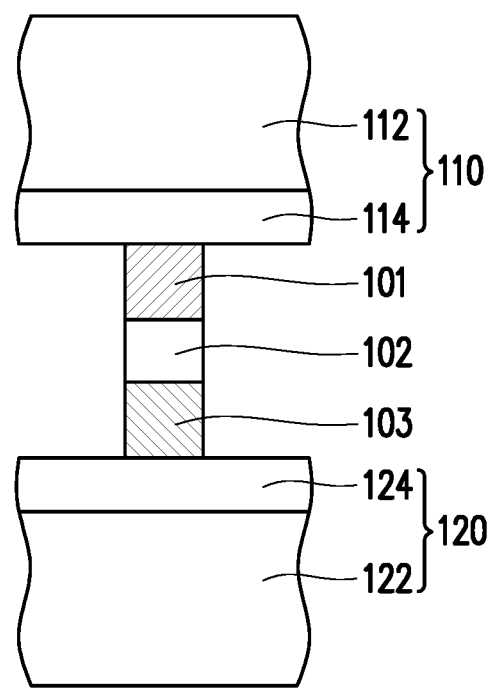
FIG. 12 schematically illustrates a cross section of a portion of a display panel according to an embodiment of the present disclosure.

FIG. 12 schematically illustrates a cross section of a portion of a display panel according to an embodiment of the present disclosure. Regarding FIG. 12, the display panel 1100 includes a first substrate 110, a second substrate 120, a first conductive protrusion 101, a second conductive protrusion 102 and a third conductive protrusion 103. From outermost to innermost layer, the first substrate 110 includes a first support plate 112 and a first conductive layer 114, and the second substrate 120 includes a second support plate 122 and a second conductive layer 124. The first conductive protrusion 101, the second conductive protrusion 102 and the third conductive protrusion 103 are disposed in a stack and form a conductor spanning the gap between first conductive layer 114 and the second conductive layer 124. Only a portion of the display panel 1100 that includes the conductor is shown in FIG. 12. The display panel 1100 is otherwise similar to the display panel 200 of FIG. 3E or the display panel 900 of FIG. 10D.

The conductor spanning the gap between the first conductive layer 114 and the second conductive layer 124 of FIG. 12 may include a first conductive protrusion 101, a second conductive protrusion 102 and a third conductive protrusion 103, and may be formed as follows, but the present disclosure is not limited thereto. The first conductive protrusion 101 may be of a different material to the first conductive layer 114, and so may be formed on the first conductive layer 114 in a similar manner to the first conductive protrusion 101 being formed on the first conductive layer 114 of the display panel 200 of FIG. 3E, as shown in FIG. 3C. In an alternative embodiment, the first conductive protrusion 101 may be of a same material as the first conductive layer 114, and so may be formed in a similar manner to the first conductive protrusion 214p of the display panel 500 of FIG. 6. The first conductive protrusion 101 is otherwise similar to the first conductive protrusion 101 of the display panel 200 of FIG. 3E.

The third conductive protrusion 103 may be of a different material to the second conductive layer 124, and so may be formed on the second conductive layer 124 in a similar manner to the first conductive protrusion 101 being formed on the second conductive layer 124 of the display panel 900 of FIG. 10D, as shown in FIG. 10C. In an alternative embodiment, the third conductive protrusion 103 may be of a same material as the second conductive layer 124, and so may be formed in a similar manner to the first conductive protrusion 224p of the display panel 1000 of FIG. 11. The third conductive protrusion 103 is otherwise similar to the first conductive protrusion 101 of the display panel 900 of FIG. 10D. The first conductive protrusion 101 and the third conductive protrusion 103 may be of a different material or of a same material.

The second conductive protrusion 102 may be similar to and formed in a similar manner to the second conductive protrusion 102 in previous embodiments, such as that of the display panel 200 of FIG. 3E. That is, the second conductive protrusion 102 is formed from curing a conductive composite material including a curable matrix material MR and metal particles MP dispersed in the matrix material MR. The matrix material MR and the metal particles MP may be similar to those corresponding to the display panel 200 of FIG. 3E, and are depicted in FIG. 3D. Specifically, the conductive composite material is similar to the second conductive protrusion material 102m of the display panel 300 as shown in FIG. 3D. In the present embodiment, prior to assembly of the display panel 1100, the conductive composite material may be formed on the first conductive protrusion 101, the third conductive protrusion 103, or a portion of the conductive composite material may be formed on the first conductive protrusion 101 and the remaining portion may be formed on the third conductive protrusion 103. During the assembling of the first substrate 110 together with the second substrate 120, the conductive composite material is compressed, and after the assembling, the conductive composite material is cured to form the second conductive protrusion 102. The amount of conductive composite material used is similar or may be less than in previous embodiments, and so compression of the conductive composite material may not cause substantial aggregation of the metal particles MP leading to the adverse effect of non-uniform cell gap.

The display panel 1100 is otherwise formed in a similar manner to that of the display panel 200 of FIG. 3E or the display panel 900 of FIG. 10D. Specifically, prior to the assembling, display medium material and sealant material may be formed on the first substrate 110, on the second substrate 120, or respective portions of the display medium material and the sealant material may be formed on the first substrate 110 and remaining portions on the second substrate 120.

In view of the above, the first conductive protrusion reduces the amount of material of the second protrusion required to electrically connect between the first conductive layer of the first substrate and the revealed portion of the second conductive layer of the second substrate. In embodiments where a precursor material of the second conductive protrusion is a conductive composite material including conductive particles, using less conductive composite material in the display panel prevents or reduces the non-uniformity of the gap between the first and second substrates caused by the aggregation of the conductive particles. Accordingly, the first conductive protrusion prevents or reduces the decreased performance of the display panel due to a non-uniform gap between the first and second substrates.

It will be apparent to those skilled in the art that various modifications and variations can be made to the embodiments and concepts disclosed herein without departing from the scope or spirit of the invention. In view of the foregoing, it is intended that the present disclosure cover modifications and variations of this invention provided they fall within the scope of the following claims and their equivalents.

What is claimed is:

1. A method of fabricating a display panel comprising:
providing a first substrate comprising a first conductive layer and a second substrate comprising a second conductive layer and a passivation layer disposed on the second conductive layer;
forming a sealant material on one of the first substrate and the second subs rate;
forming a first conductive protrusion on the one of the first substrate and the second substrate, wherein the first conductive protrusion is located between an edge of the one of the first substrate and the second substrate and the sealant material, and in contact with a corresponding one of the first conductive layer and the second conductive layer; and
forming a conductive composite material on the first conductive protrusion, wherein the conductive composite material comprises a matrix material and metal particles;
assembling the first substrate and the second substrate via the sealant material;
forming a display medium layer between the first substrate and the second substrate, wherein the display medium layer is surrounded by the sealant material; and
curing the sealant material and the conductive composite material to form a sealant and a second conductive protrusion respectively,
wherein the first conductive protrusion is a stacked structure comprising more than one electrically conductive material, and the passivation layer is surrounded by either one of the first conductive protrusion or the second conductive protrusion.

2. The method of claim 1, wherein a material of the first conductive protrusion and a material of the second conductive protrusion are different.

3. The method of claim 1, wherein the matrix material comprises a curable material.

4. The method of claim 1, wherein the metal particles comprise nickel particles.

5. The method of claim 1, wherein a material of the first conductive protrusion is the same as the corresponding one of the first conductive layer and the second conductive layer.

6. The method of claim 1, wherein assembling the first substrate and the second substrate causes the conductive composite material to be compressed.

7. The method of claim 6, wherein the other one of the first substrate and the second substrate further comprises an alignment layer covering the other one of the first conductive layer and the second conductive layer and the conductive composite material penetrates the alignment layer to be in contact with the other one of the first conductive layer and the second conductive layer during the assembling of the first substrate and the second substrate.

* * * * *